July 18, 1933.  F. H. JONES  1,918,755
SPRING SUSPENSION FOR VEHICLES
Filed March 21, 1932
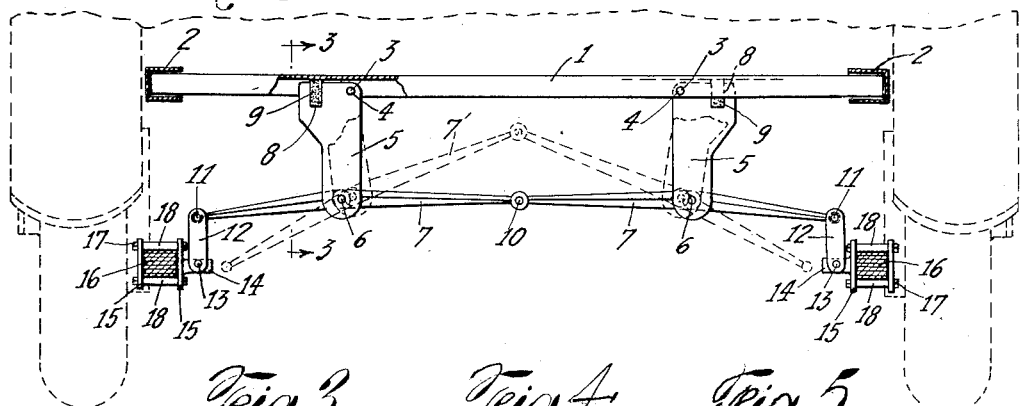
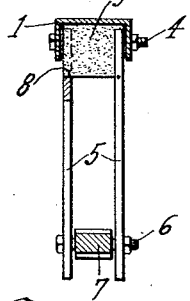
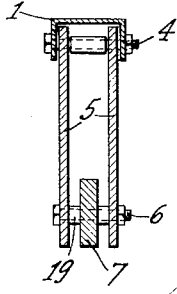
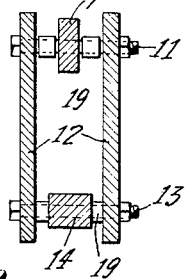
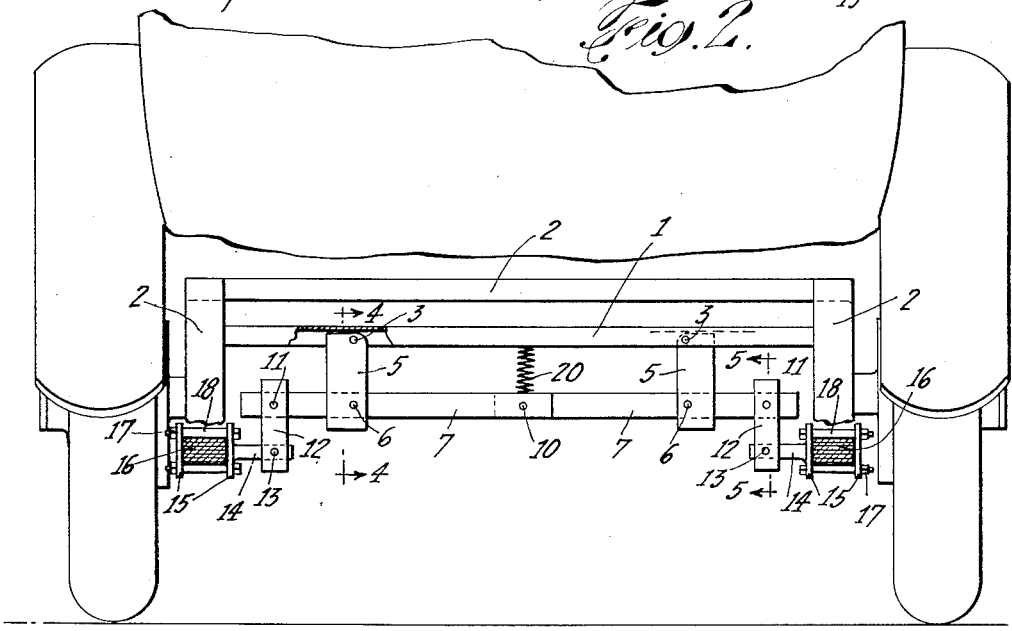
INVENTOR
FRANK H. JONES.
BY
O'Boyle and Norton
ATTORNEYS Patented July 18, 1933

1,918,755

UNITED STATES PATENT OFFICE

FRANK H. JONES, OF BOISE, IDAHO

SPRING SUSPENSION FOR VEHICLES

Application filed March 21, 1932. Serial No. 600,255.

The invention relates to improvements in spring suspensions for vehicles, and specifically to an equalizing mechanism for automobiles. More particularly, the invention relates to an improved compound lever mechanism adapted to be attached to an automobile frame whereby to maintain the said frame upon even keel when traveling in a curvilinear direction at relatively high speeds.

Owing to the high velocities at which automobiles travel as compared with other vehicles, the springs and the chassis are subjected to greater strains, and where there are sharp curves it is necessary to reduce speed appreciably in order to prevent the machine from turning over. The present invention provides relatively simple and positive means for remedying this danger of overturning by providing an equalizing mechanism disposed between the rear springs and rear ends of the chassis frame whereby the frame is maintained on an even keel at all angles of the wheels.

The improved mechanism which forms the subject matter of the present invention comprises generally a main supporting member adapted to be secured to the rear end of a chassis frame from which are pivotally supported a pair of shackles, each of which in turn acts as a pivotal support for a lever, the two levers being pivotally connected at their adjoining ends centrally of the main supporting bar, and at their other ends are pivotally mounted in shackles which are adapted to be secured to the rear springs of the machine by means of suitable yokes.

Referring more specifically to the drawing,

Fig. 1 is an elevation, partly in section, of an improved equalizer mechanism mounted on an automobile, parts of which are shown in phantom view;

Fig. 2 is a view similar to Fig. 1, showing a modified form of equalizer mechanism;

Fig. 3 is a sectional view taken on the line 3—3 of Fig. 1;

Fig. 4 is a sectional view taken on line 4—4 of Fig. 2, and

Fig. 5 is a sectional view taken on the line 5—5 of Fig. 2.

One form of the improved mechanism, as shown, may comprise a demountable main supporting frame 1 of channel iron or other suitably shaped material which may be rigidly fastened to the frame members 2 of an automobile, or other vehicle, in any suitable manner, not shown. The member 1 of channel shaped iron, as shown, is inverted in place and is provided with aligned holes 3 substantially one quarter of its length from either end. These holes are provided with shackle bearings 4 adapted to form a support for the offset shackle supporting members 5 of spring steel or other suitable material. Offset shackle bolts 6 are also provided and serve as fulcrums for the levers 7 of the equalizing mechanism.

The shackle members 5 are spaced apart by the lever and may be of any suitable shape, and, in the form shown in Fig. 1, they are provided with slots 8 into which may be fitted snubbing members 9 of rubber or any other suitable material.

The levers 7, as noted, are fulcrumed on their supports 5 by means of the shackle bolts 6 and are fulcrumed to each other at 10. At their opposite ends the levers 7 are provided with fulcrums 11 which act as supports for a plurality of shackle members 12 similar to the members 5, above described. These plates may be made of any suitable material such as spring steel of any desired thickness, depending upon the weight to be supported. The shackles 12 are provided at the bottom with shackle bolts 13 adapted to hold the yoke 14 in position. The yoke 14 comprises a pair of opposed plates 15 mounted on either side of the rear spring 16, suitable bolt connections 17 covering members 18 being used to hold them tightly in position. Resilient spacers 19 may be used where necessary or desired.

In Fig. 2, a spring member 20 is shown between the fulcrum 10 and the supporting member 1 of the equalizer system, the function of this spring being to prevent contacting of the fulcrum with the frame when going over jounces. This member also prevents the transmission of vibrations to the chassis, as do resilient members 9 mounted in the shackles 5, in the form shown in Fig. 1.

As shown more particularly in Fig. 1, it will be noted that as one side of the chassis tends to be lifted above the other, the shackle member 5 positioned on that side will tend to raise the cooperating lever 7 up into the position 7', at the same time causing the shackle to move inwardly of the car. The other member of the compound lever system is moved in like manner so that no matter what angle the wheels take with relation to the road, the plane of the chassis will remain substantially horizontal. It has been found possible to make a 90° corner at a speed of up to 45 miles per hour at street intersections without tipping or swaying the car, as the entire weight is transferred through this device equally onto both rear springs, and naturally onto all the wheels. In particular, the weight of the car, when rounding a curve, is transferred to the outside spring, which is generally not the case in vehicles which are not provided with this equalizing mechanism, as in such cases the tendency is for the entire weight to be transferred to the inside spring of the circle traveled by the car. When this weight exceeds a desired limit or the arc of the turn is too small, the car often tips over.

Whenever any strain of pressure in the car is produced by turning corners or riding on bumpy roads, such strains are automatically transferred to both rear springs by means of the shackles 5 and 12. The improved device of the present invention also eliminates side pulling on the side of the car, which often results in pulling the car off the road if an attempt is made to take corners or curves at too high a speed. This improved device holds the rear end of the car down on curves and corners at substantially any rate of speed. As noted above, there is an utter absence of sway in a car fitted with this device even when making a 90° or square turn at 40 miles an hour. On a curve, the outside spring is drawn down, as well as the inside spring, so that the body is held from tipping and the steering device is maintained in perfect balance. On the inside of a curve, a shorter pull is made which, due to the lever connections with the car, makes the car lean in instead of out, and that compensates for any tendency for the body mounted on the chassis to move tangentially to the arc of travel of the chassis or frame.

It will now be appreciated that there has been provided an improved compound lever equalizer mechanism adapted to be applied to all types of vehicles for the purpose of freeing them from side sway and increasing the speed at which cars may be safely driven around corners and curves, without sacrificing any safety factors. The device is simple and economical to manufacture and may be applied as a unit to any type of car without requiring dismantling of the car.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. An equalizer mechanism comprising a supporting member adapted to be secured to a vehicle frame, a pair of fulcrum supports mounted in said main support and inwardly of the ends thereof, said supports being offset with respect to their respective points of support, and being provided with resilient members adapted to engage said main support, a pair of levers, each of which is fulcrumed at the bottom of said supports and mutually fulcrumed at their inner ends whereby to form a compound lever, and shackles fulcrumed at the free ends of said levers, said shackles serving as fulcrums for clamping devices adapted for engagement with the vehicle spring.

2. An equalizer mechanism comprising a supporting member adapted to be secured to a vehicle frame, offset shackles fulcrumed on the main support and inwardly of the ends thereof, said shackles being offset with respect to their respective points of support, and being provided with resilient members adapted to engage said main support, a pair of levers, each of which is fulcrumed at the bottom of said supports and mutually fulcrumed at their inner ends whereby to form a compound lever, and shackles fulcrumed at the free ends of said levers, said shackles serving as fulcrums for clamping devices adapted for engagement with the vehicle spring.

3. An equalizer mechanism comprising a supporting member adapted to be secured to a vehicle frame, a pair of fulcrum supports mounted in said main support and inwardly of the ends thereof, said supports being offset with respect to their respective points of support, and being provided with resilient members adapted to engage said main support, and spring members disposed between said fulcrum supports and the main support, whereby to prevent vibrations.

FRANK H. JONES.